(12) United States Patent
Terwillegar et al.

(10) Patent No.: US 10,815,381 B2
(45) Date of Patent: Oct. 27, 2020

(54) DICYCLOPENTADIENE MODIFIED ESTER OLIGOMERS USEFUL IN COATING APPLICATIONS

(71) Applicant: PTT GLOBAL CHEMICAL PUBLIC COMPANY LIMITED, Bangkok (TH)

(72) Inventors: Arne Matthew Terwillegar, Kernersville, NC (US); Charliss Denniston, Belmont, MA (US); Nuttara Jamonnak, Woburn, MA (US); Thidarat Tosukhowong, Billerica, MA (US)

(73) Assignee: PTT GLOBAL CHEMICAL PUBLIC COMPANY LIMITED, Bangkok (TH)

( * ) Notice: Subject to any disclaimer, the term of this patent is extended or adjusted under 35 U.S.C. 154(b) by 182 days.

(21) Appl. No.: 15/774,085

(22) PCT Filed: Dec. 20, 2016

(86) PCT No.: PCT/US2016/067806
§ 371 (c)(1),
(2) Date: May 7, 2018

(87) PCT Pub. No.: WO2017/112680
PCT Pub. Date: Jun. 29, 2017

(65) Prior Publication Data
US 2018/0327605 A1  Nov. 15, 2018

Related U.S. Application Data

(60) Provisional application No. 62/270,377, filed on Dec. 21, 2015.

(51) Int. Cl.

| | | |
|---|---|---|
| C09D 167/07 | (2006.01) | |
| C09D 167/06 | (2006.01) | |
| C09D 4/00 | (2006.01) | |
| C08G 63/40 | (2006.01) | |
| C08G 63/685 | (2006.01) | |
| C09D 7/63 | (2018.01) | |
| C09D 11/101 | (2014.01) | |
| C09D 11/104 | (2014.01) | |
| C08K 5/053 | (2006.01) | |
| C08K 5/092 | (2006.01) | |
| C08F 20/18 | (2006.01) | |
| C08G 63/553 | (2006.01) | |
| C08G 63/78 | (2006.01) | |
| C08K 5/14 | (2006.01) | |

(52) U.S. Cl.
CPC .............. *C09D 4/00* (2013.01); *C09D 7/63* (2018.01); *C09D 11/101* (2013.01); *C09D 11/104* (2013.01); *C08F 20/18* (2013.01); *C08G 63/553* (2013.01); *C08G 63/78* (2013.01); *C08K 5/053* (2013.01); *C08K 5/092* (2013.01); *C08K 5/14* (2013.01)

(58) Field of Classification Search
None
See application file for complete search history.

(56) References Cited

U.S. PATENT DOCUMENTS

| | | | | |
|---|---|---|---|---|
| 4,100,120 A | * | 7/1978 | Maekawa | C08F 299/0478 525/7 |
| 4,224,430 A | * | 9/1980 | Maekawa | C08F 299/0478 526/204 |
| 5,691,432 A | | 11/1997 | Williams | |
| 5,780,558 A | | 7/1998 | Klang et al. | |
| 6,235,856 B1 | | 5/2001 | Hafner et al. | |
| 6,384,151 B1 | | 5/2002 | Matsukawa et al. | |

FOREIGN PATENT DOCUMENTS

| | | | | |
|---|---|---|---|---|
| EP | 2735579 A1 | * 5/2014 | ............ | C08G 63/553 |
| JP | 11-049849 A | 2/1999 | | |
| JP | 2003089709 A | * 3/2003 | ............ | C08F 283/01 |
| WO | WO-2019010006 A1 | * 1/2019 | ............ | C09D 175/14 |

OTHER PUBLICATIONS

Machine translation of JP-2003089709-A (no date).*

* cited by examiner

*Primary Examiner* — Michael J Feely
(74) *Attorney, Agent, or Firm* — Oblon, McClelland, Maier & Neustadt, L.L.P.

(57) ABSTRACT

This invention relates to a thermally and/or high-energy radiation curable waterborne or 100% solid coating with high bio-based content. The coating formulation according to the present invention is derived or partially derived from melt polycondensation of a carboxylic acid and a diol with dicyclopentadiene-maleic acid half-ester or nadic acid-maleic acid half-ester or methyl nadic acid-maleic acid half-ester.

8 Claims, 7 Drawing Sheets

DICYCLOPENTADIENE MODIFIED ESTER OLIGOMERS USEFUL IN COATING APPLICATIONS

CROSS REFERENCE TO RELATED APPLICATION

This application is the U.S. national stage application of International Application No. PCT/US2016/067806 filed on Dec. 20, 2016, which claims priority to U.S. Provisional Application No. 62/270,377 filed on Dec. 21, 2015.

FIELD OF THE INVENTION

The present invention is in the field of unsaturated polymer resins with high bio-based content and their application in waterborne coatings curable using peroxide or ultraviolet radiation or electron beam radiation or thermal energy.

BACKGROUND OF THE INVENTION

In recent years, it has become possible to manufacture a number of carboxylic acids such as lactic acid, 3-hydroxy propionic acid, succinic acid and itaconic acid and diols such as 1,3-propanediol and butanediol in industrial scale through biological fermentation using renewable biological feedstock. There have also been significant technical advances in manufacturing polymer resins comprising ester oligomers with significant percentages of bio-based carboxylic acids and alcohols. These ester oligomers with significant amount of bio-based components can be mixed with liquid ethylenically-unsaturated monomers to yield polymer resins useful in coating applications.

There has also been a growing interest in developing radiation curing of polymer resins useful in coating applications due to the absence of any volatile organic content, speed of curing process and efficiency. Taken together, the radiation curing process and the use of bio-based monomeric components in the manufacture of polymer resins useful in coating applications pave the way to achieve sustainability goals of the chemical industry.

U.S. Pat. Nos. 3,166,434, 3,340,327 and 3,399,153, all assigned to Desoto Inc., teach dicyclopentadiene and cyclopentadiene modified polyester resins.

U.S. Pat. No. 3,347,806, assigned to Chemische Werke, teaches a dicyclopentadiene modified unsaturated polyesters and process for preparing them.

U.S. Pat. No. 3,448,066, assigned to PPG Industries, Inc., teaches air drying of unsaturated polyester resins prepared from polyol, an adduct of cyclopentadiene and a dicarboxylic acid.

U.S. Pat. Nos. 3,883,612 and 3,933,757, both assigned to SCM Corporation, teach dicyclopentadiene modified polyester resins.

U.S. Pat. Nos. 4,029,848, 4,148,765, 4,167,542, 4,348,499, 4,360,647, 4,435,530, 4,443,580, 4,496,688 and 4,540,829, all assigned to The Dow Chemical Company, teach one or other dicyclopentadiene or cyclopentadiene modified ester oligomers.

U.S. Pat. No. 4,233,432, assigned to United States Steel Corporation, teaches a method of preparing unsaturated polyester resins containing high amounts of dicyclopentadiene.

U.S. Pat. No. 4,322,504, assigned to Hoechest Aktiengesellschaft, teaches a resin binder containing a norbornane ring system.

U.S. Pat. No. 4,332,931, assigned to Takeda Chemical Industries, Ltd., teaches unsaturated polyester produced by reacting dicarboxylic acid anhydride with alkylene oxide in the presence of a reaction product of dicarboxylic acid and dicyclopentadiene.

U.S. Pat. Nos. 4,522,977, 4,522,978, 4,532,296, 4,532,297, and 4,626,570, all assigned to Union Carbide Corporation, teach one or other dicyclopentadiene or cyclopentadiene modified ester oligomers.

U.S. Pat. No. 4,525,427, assigned to The Alpha Corporation, teaches polyester composition modified with dicyclopentadiene.

U.S. Pat. Nos. 5,770,653 and 6,384,151, both assigned to Nippon Shokubai Co., Ltd., teach dicyclopentadiene modified polyester resins.

U.S. Pat. Nos. 6,288,146, 6,632,481, and 6,803,393, all assigned to BASF Aktiengesellschaft, teach binder composition comprising dicyclopentadiene or its derivatives.

U.S. Pat. No. 6,515,071, assigned to Ashland Inc., teaches a process for the preparation of dicyclopentadiene modified unsaturated polyester.

The present invention relates to the process of formulating polyester resin compositions comprising unsaturated ester oligomers derived from bio-based components for coating applications and using that polyester resin composition to laminate a variety of surfaces following peroxide treatment or thermal energy treatment or UV radiation or high-energy radiation curing procedure. More specifically, the present invention provides the procedure for preparing modified ester oligomers wherein the modification of ester oligomers involves the incorporation dicyclopentadiene at the ends of the ester oligomers or incorporation of nadic acid or methyl nadic acid in the backbone of the ester oligomers. Procedure for preparing dicyclopentadiene or nadic acid or methyl nadic acid modified ester oligomers are provided in the instant invention. Also provided in this invention are the procedures for preparing polyester resins by combining dicyclopentadiene or nadic acid or methyl nadic acid modified ester oligomers with ethylenically-unsaturated monomers and their use in the coating applications with appropriate curing procedures The coating composition of the present invention is suitable for use on the surface of broad range of substrates. The coating composition of the present invention is also useful as ink, paint and paint varnish.

SUMMARY OF THE INVENTION

The present invention provides a process for producing ester oligomers useful in formulating polyester resins useful in coating applications and curing such polyester resins on a variety of substrates using curing process involving the use of peroxides or thermal energy or ultra violet radiation or electron beam radiation.

In one embodiment, the present invention teaches a process for preparing dicyclopentadiene modified ester oligomers involving at least one carboxylic acid, at least one diol and dicyclopentadiene. In one aspect of this embodiment, a process is provided for preparing an ester oligomer having two dicyclopentadiene units, one at each end of the ester oligomer. In another aspect, the present invention provides a process for preparing an ester oligomer having a single unit of dicyclopentadiene. In yet another aspect of this embodiment, the present invention provides a process for producing dicyclopentadiene modified oligomers with acid functional group or hydroxyl functional group or urethane acrylate functional group. In one aspect of this embodiment, bio-based 1,3-propanediol is used as a diol and bio-based succinic acid is used as a dicarboxylic acid.

In another aspect of this embodiment, the dicyclopentadiene modified ester oligomer is blended with a liquid ethylenically-unsaturated monomer and used as a polyester resin formulation in coating applications on a variety of substrates. In yet another aspect of this embodiment, the polyester resin formulation useful in coating applications further contains one or more photoinitiators and is cured over the substrates using ultraviolet or electron beam radiation. The polyester resin formulation developed for curing using ultraviolet or electron beam radiation may further contain certain peroxide initiators to facilitate chemical crosslinking between the ester oligomer and ethylenically-unsaturated monomers.

In another embodiment of the present invention, a process for producing ester oligomers containing nadic acid in its back bone is provided. According to this embodiment, when dicyclopentadiene is subjected to temperature in the range of 140° C.-180° C., cyclopentadiene is produced which reacts with maleic anhydride in a Diels-Alder reaction to yield nadic anhydride. Upon reacting nadic anhydride with diols and dicarboxylic acids, an ester oligomer with nadic acid in the backbone is produced. In one aspect of this embodiment, bio-based 1,-3-propanediol is used as a diol and bio-based succinic acid is used as a dicarboxylic acid. In yet another aspect of this embodiment, the present invention provides a process for producing nadic anhydride modified oligomers with acid functional group or hydroxyl functional group or urethane acrylate functional group. In another aspect of this embodiment, the ester oligomer comprising nadic anhydride, diol and a dicarboxylic acid is blended with a liquid ethylenically-unsaturated monomer and used as a polyester resin formulation in coating applications on a variety of substrates. In yet another aspect of this invention, the polyester resin formulation useful in coating applications further contains one or more photoinitiators and is cured over the substrates using ultraviolet radiation or electron beam radiation. The resin formulation comprising cyclopentadiene modified ester oligomer may further contain certain peroxide initiators to facilitate chemical crosslinking between the ester oligomer and ethylenically-unsaturated monomers.

In yet another embodiment of the present invention, methyl nadic anhydride is used in place of nadic anhydride to produce methyl nadic acid modified ester oligomers. In one aspect of this embodiment, bio-based 1,3-propanediol is used as a diol and bio-based succinic acid is used as a dicarboxylic acid. In yet another aspect of this embodiment, the present invention provides a process for producing cyclopentadiene modified oligomers with acid functional group or hydroxyl functional group or urethane acrylate functional group. In another aspect of this embodiment, the ester oligomer comprising methyl nadic anhydride, diol and a dicarboxylic acid is blended with a liquid ethylenically-unsaturated monomer and used as a polyester resin formulation in coating applications on a variety of substrates. In yet another aspect of this invention, the polyester resin formulation useful in coating applications further contains one or more photoinitiators and is cured over the substrates using ultraviolet radiation or electron beam radiation. The resin formulation comprising cyclopentadiene modified ester oligomer may further contain certain peroxide initiators to facilitate chemical crosslinking between the ester oligomer and ethylenically-unsaturated monomers.

In another embodiment the present invention the dicyclopentadiene modified ester oligomer, nadic acid modified ester oligomer and methyl nadic acid modified ester oligomers can be mixed in different proportions in a liquid ethylenically-unsaturated monomer to yield a polymer resin useful in coating applications.

The polyester resins prepared according to the present invention is useful in coating applications on a broad range of substrates including polyester, polypropylene, polystyrene and glass and steel.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION OF THE PREFERRED EMBODIMENTS

Figure 1:
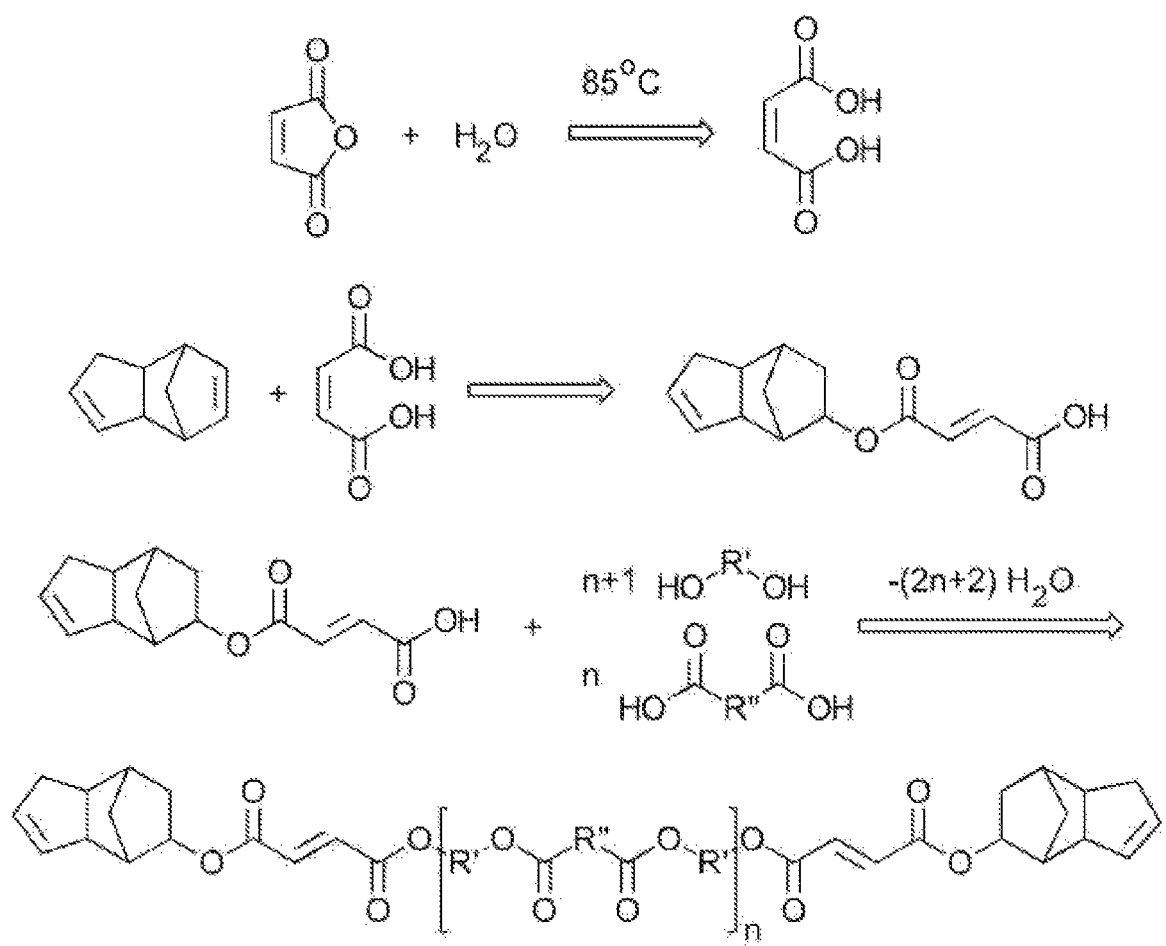
FIG. 1. Process for preparing dicyclopentadiene modified ester oligomer. In the first step of this process, maleic anhydride is reacted with water at elevated temperature to yield maleic acid which is allowed to react with dicyclopentadiene to produce maleic acid-dicyclopentadiene half-ester which is also referred as maleic acid-dicyclopentadiene adduct. With further addition of a diol and additional dicarboxylic acid, an ester oligomer is formed. There are two maleic acid-dicyclopentadiene adducts in the resulting ester oligomer, one at each end of the ester oligomer. The R' in the diol and R" in the dicarboxylic acid are represented by aliphatic, cycloaliphatic, araliphatic and aromatic hydrocarbon groups of 1 to 20 carbon atoms and n in the ester oligomer is preferably 1 to 10.

The present invention provides methods for producing unsaturated polymer resins which are useful in preparing coating formulations with excellent adhesion properties. The coating formulations prepared according to the present invention are suitable for laminating a variety of surfaces and can be cured using ultraviolet radiation or electron beam radiation or thermal energy and peroxide treatment. In one embodiment, the coating formulations with enhanced adhesion properties are suitable for use on the substrates with the surface tension of less than 65 dynes/cm. The list of the substrates with surface tension less than 65 dynes/cm includes polyolefins, polypropylene, polystyrene, polyvinyl chloride, acrylonitrile butadiene styrene and styrene butadiene rubber. In another embodiment, the present invention provides coating formulations with enhanced adhesion properties which are suitable for use on the very high surface energy substrates such as glass and metal where the surface tension is more than 65 dynes/cm.

As defined in this invention, the term "polymer resin" includes both polyester resin and polyurethane resin. Polyester resins useful in the present invention are prepared by mixing ester oligomers prepared according to the present invention with liquid ethylenically-unsaturated monomers. The present invention provides the procedure for preparing a number of ester oligomers useful in the preparation of polyester resins useful in the coating applications. Representative examples of ester oligomers include but not limited to dicyclopentadiene modified ester oligomers, nadic acid modified ester oligomers and methyl nadic acid modified ester oligomers which can be mixed individually or in combination with liquid ethylenically unsaturated monomers to yield polyester resins which are useful in the coating applications on a broad range of substrates. The polyester resin formulations useful in coating applications further contains one or more photoinitiators and is cured over the substrate using ultraviolet or electron beam radiation. The polyester resin formulation developed for curing using ultraviolet or electron beam radiation may further contain certain peroxide initiators to facilitate chemical crosslinking between the ester oligomer and ethylenically-unsaturated monomers.

The term "ester oligomer" as defined in the present invention includes the products resulting from the reaction involving at least one carboxylic acid, one diol and one of the reagents selected from a group consisting of dicyclopentadiene, nadic anhydride and methyl nadic anhydride. The synthesis of ester oligomer of the present invention may optionally involve the use of isophoronone diisocyanate and 2-hydroxyethyl acrylate.

The dicarboxylic acid used in the preparation of polyester resin may be saturated or unsaturated. When the dicarboxylic acid used in the preparation of polyester resin is saturated carboxylic acid, the resulting polyester is referred as saturated polyester. On the other hand, when the carboxylic acid used in the preparation of polyester has unsaturated double bond, the resulting polyester resin is referred as an unsaturated polyester resin. The carboxylic acids suitable for the preparation of a polyester resin according to the present invention is selected from a group consisting of succinic acid, oxalic acid, malonic acid, maleic acid, fumaric acid, glutaric acid, adipic acid, cinnamic acid, pimelic acid, suberic acid, azelaic acid, citraconic acid, sebacic acid, malic acid, itaconic acid, muconic acid, citric acid, aconitic acid, propane-1,2,3-tricarboxylic acid, trimesic acid, 2-butynedioic acid, 1,4-cyclohexane dicarboxylic acid, hexahydrophthalic acid, hexachloroendomethylenetetrahydrophthalic acid, dichlorophthalic acid, isophthalic acid, terephthalic acid, trimellitic acid, or mixtures thereof. The bio-renewable saturated and/or unsaturated dicarboxylic acid such as succinic acid, muconic acid, adipic acid, cinnamic acid, fumaric acid, itaconic acid, citric acid, or a mixture thereof, are preferred.

The diols suitable for the preparation of a polymer resin according to the present invention is selected from a group consisting of ethylene glycol, propylene glycol, benzyl alcohol, neopentylglycol, butanediol, pentanediol, hexanediol, cyclopentanediol, cyclohexanediol, dimethylol cyclohexane, diethylene glycol, glycerol, trimethylol propane, butanetriol, pentaerytritol, dipentaerythritol, cyclohexanetriol, or mixtures thereof. The bio-renewable dihydric and/or trihydric alcohol such as ethylene glycol, 1,3-propanediol, 1,4-butanediol, isosorbide, or a mixture thereof, are preferred.

Biocatalysts have been developed to manufacture a number of carboxylic acid such as succinic acid, muconic acid, lactic acid, and 3-hydroxypropionic acid and a number of diols such as 1,3-propanediol and butanol using biological feedstock such as glucose, glycerol and sucrose. These specialty chemicals derived from biological materials are referred herein as bio-based and are suitable for use in a number chemical and polymer industries to develop materials with desirable properties. These materials have properties close to the materials derived from petrochemical feedstock and thus these bio-based feedstocks could be used to avoid the dependence on fossil fuels. The representative examples provided in this patent application involves the use of the bio-based specialty chemicals such as 1,3-propanediol and succinic acid in the preparation for coating materials with improved curing properties. Since there is no chemical difference other than the C14/C12 ratio between the 1,3-propanediol and succinic acid derived from renewable biological materials and the same chemicals derived from petrochemical feedstock, the method of manufacturing coating formulations according to the present invention can be practiced using either the 1,3-propanediol and succinic acid derived from renewable biological materials or 1,3-propanediol and succinic acid derived from petrochemical feedstock. In preferred embodiments of the present invention, it is desirable to use 1,3-propanediol and succinic acid obtained from renewable biological feedstock to achieve the sustainability goals of the chemical industry.

In one embodiment of the present invention, dicyclopentadiene is used to modify the ester oligomers to impart air drying characteristics, low profile properties, high heat distortion, excellent weathering performance, and increased filler dispersion in the resulting polyester resin. In using dicyclopentadiene for the purpose of modifying ester oligomers, the following steps are followed. Dicyclopentadiene and water are charged to a reactor and the temperature is elevated to 80° C. followed by the addition of maleic anhydride and the temperature is raised to 125° C. to enable the formation of maleic acid-dicyclopentadiene half-ester which is also referred as maleic acid-dicyclopentadiene adduct. Once the maleic acid-dicyclopentadiene is formed, a suitable diol and additional carboxylic acid are added and the temperature of the vessel is increased to 205° C. to initiate the synthesis of ester oligomer. The reaction is held at 205° C. until a desirable acid value for the resulting oligomeric ester is achieved (FIG. 1).

Maleic anhydride and dicyclopentadiene useful in the present invention are derived from petrochemical feedstock. Succinic acid useful in the present invention is derived either from renewable biological resources through microbial fermentation or from petrochemical feedstock either via chemical or biological conversion. 1,3-propanediol useful in the present invention is derived either from renewable biological resources through microbial fermentation or from petrochemical feedstock either via chemical or biological conversion. As defined in this invention, renewable biological material includes any feedstock derived from plant materials as opposed to the materials derived from petrochemical feedstock. The term "renewable biological material" is also used interchangeably with the term "biomass". The term "biomass" as used in the present invention refers to carbohydrates, sugars, glycerol and lignocellulosic materials derived from renewable plant resources which can be used in the fermentative production of succinic acid or 1,3-propanediol.

Figure 2:
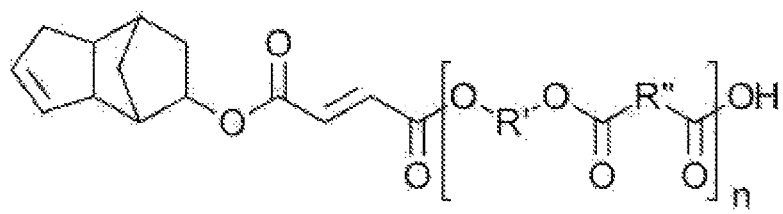
FIG. 2. Depending on the relative proportion of the diol and dicarboxylic acid in the reaction mixture used in the formation of ester oligomer from maleic acid—dicyclopentadiene adduct, either a ester oligomer with acid functional group (shown on the top) or a ester oligomer with hydroxyl functional group (shown in the middle) are formed. Under certain experimental conditions as described in the specification, ester oligomer with acrylate functional group (shown in the bottom) is produced with the inclusion of isophorone diisocyanate and 2-hydroxyethyl acrylate in the reaction medium.
Figure 2:
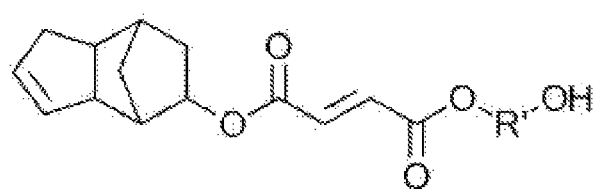
Figure 2:
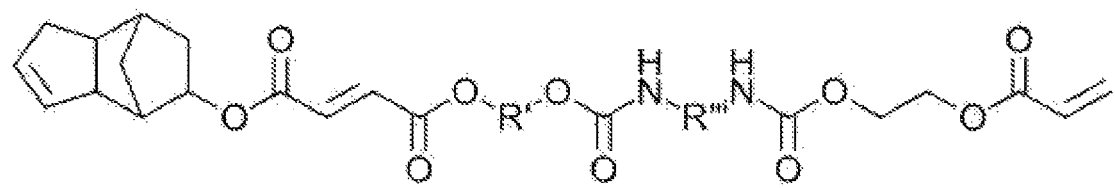

By means of using different proportions of maleic acid-dicyclopentadiene adduct, carboxylic acid and diol, it is possible to synthesize dicyclopentadiene modified ester oligomers with specific composition and with specific functional group. By means of maintaining low ratio between the concentration of maleic acid-dicyclopentadiene adduct and the combined concentration of dicarboxylic acid and diol, it is possible to synthesize different types of dicyclopentadiene modified ester oligomers (FIG. 2).

In one type of dicylcopentadiene modified ester oligomer, there are two maleic acid—dicyclopentadiene adducts, one at each end of the resulting ester oligomer. Further by means of manipulating the relative concentration dicarboxylic acid and diol in the reaction mixture, it is possible to control the relative length of the polyester unit in between the two of maleic acid-dicyclopentadiene adducts. Thus, in a dicyclopentadiene modified ester oligomer, the number of repeating unit with ester bonds in between the two of maleic acid—dicyclopentadiene adducts may range from 1 to 10.

In the second type of dicyclopentadiene modified ester oligomer, there is only one maleic acid-dicyclopentadiene adduct per molecule. In this type of dicyclopentadiene modified ester oligomer with one maleic acid-dicyclopentadiene adduct at the one of the molecule, it is further possible to introduce specific functional group at the other end of the molecule (FIG. 2). In one aspect of the present invention, it is possible to have a hydroxyl functional group at the end of the dicyclopentadiene modified ester oligomer by means of using a higher ratio of diol to carboxylic acid in the reaction mixture. In another aspect of the present invention, it is possible to have a carboxylic acid functional group at the end of dicyclopentadiene modified ester oligomer by means of using a higher ratio of carboxylic acid to diol in the reaction mixture.

The present invention also provides a procedure to introduce an acrylate functional group at the end of the dicyclopentadiene modified ester oligomer. In the first step of this procedure to introduce an acrylate functional group at the end of the dicyclopentadiene modified ester oligomer, a dicyclopentadiene modified ester oligomer with hydroxyl functional group and having a hydroxyl number of more than 100 is synthesized. In the second step of the preparation of a dicyclopentadiene modified ester oligomer with an acrylate functional group, the ester oligomer from the first step is reacted with isophorone diisocyanate and 2-hydroxyethyl acrylate in two step reaction to obtain dicyclopentadiene modified ester oligomer with an acrylate functional group as shown in FIG. 2.

Figure 3:
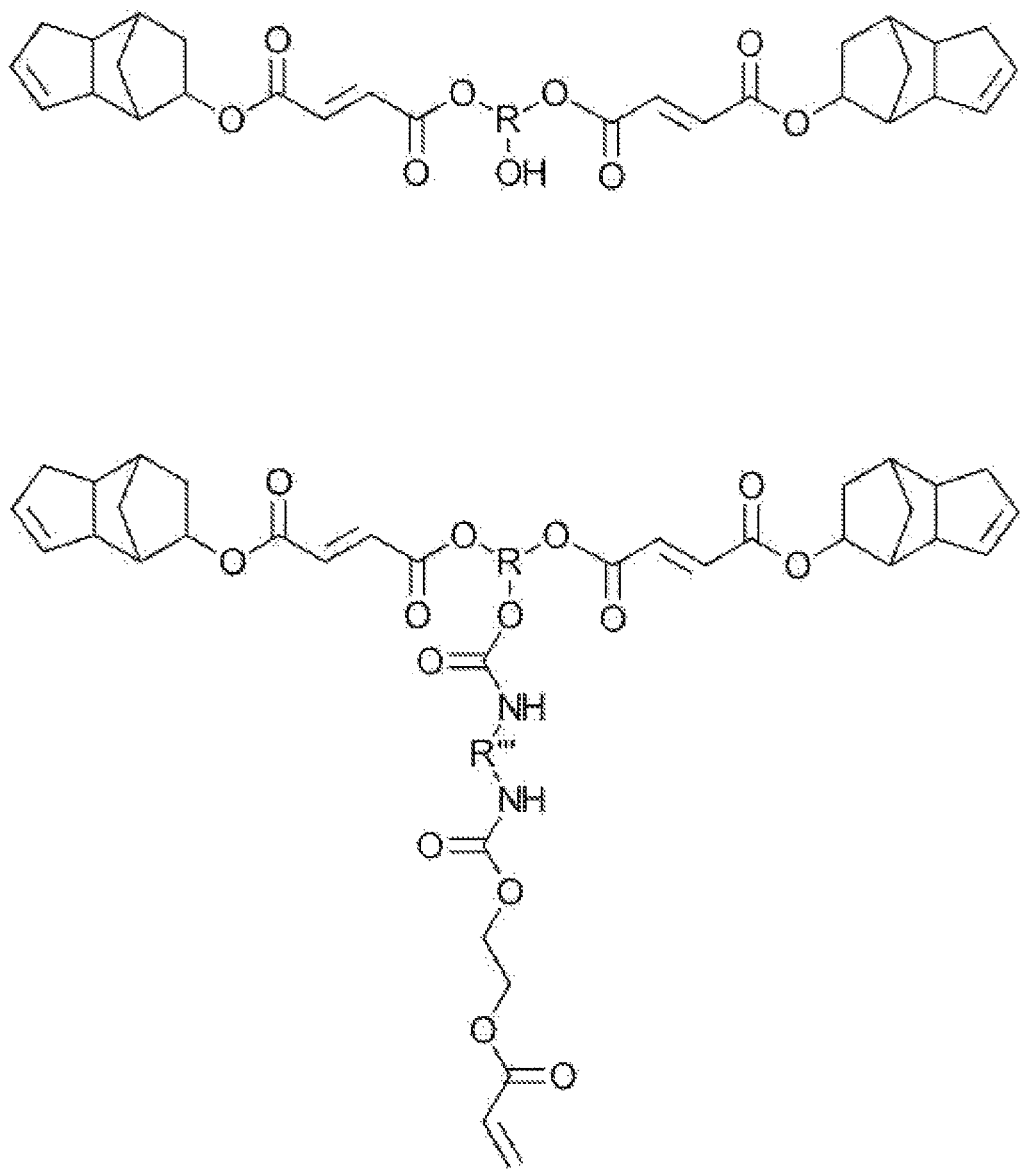
FIG. 3. Preparation of dicyclopentadiene modified ester oligomer with hydroxyl functional group and dicyclopentadiene modified ester oligomer with acrylate functional group. In the first step of the process a maleic acid-dicyclopentadiene half ester is reacted with trimethylol propane to yield an ester oligomer with hydroxyl functional group with very high hydroxyl number (shown at the top). In the next step, the ester oligomer with hydroxyl functional group from the first step is reacted with diisocyanate and acrylate to yield a dicyclopentadiene modified with acrylate functional group (shown at the bottom).

In yet another aspect, the present invention provides a procedure to produce dicyclopentadiene modified ester oligomer with hydroxyl functional group and dicyclopentadiene modified ester oligomer with acrylate functional group. In the first step of this process, a maleic acid-dicyclopentadiene half ester is reacted with trimethylol propane to yield an ester oligomer with hydroxyl functional group with very high hydroxyl number (shown at the top in FIG. 3). The product from the first step of the reaction is referred as trifunctional dicyclopentadiene modified ester oligomer. In the next step, the ester oligomer with hydroxyl functional group from the first step is reacted with isophorone diisocyanate and 2-hydroxyethyl acrylate to yield a dicyclopentadiene modified ester oligomer with acrylate functional group (shown at the bottom of FIG. 3). The product from the second step of the reaction is referred as trifunctional dicyclopentadiene modified ester oligomer with urethane acrylate functional group.

Figure 4:
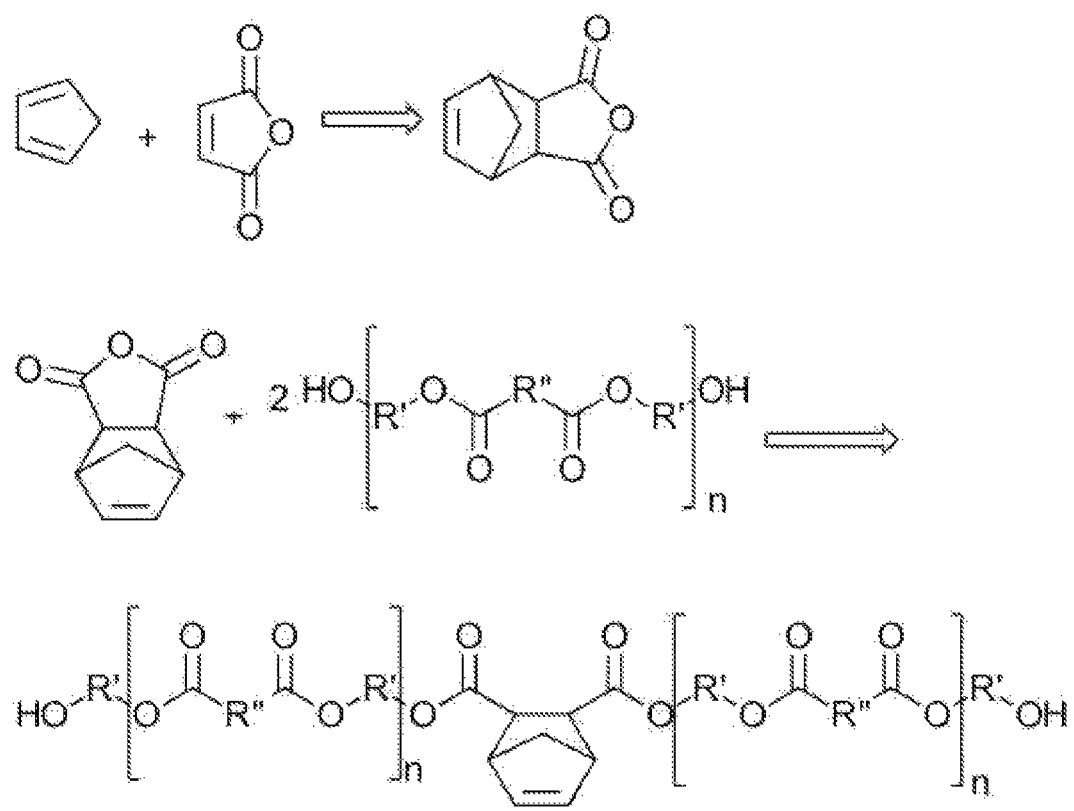
FIG. 4. Preparation of ester oligomer incorporating nadic moiety. When dicyclopentadiene is subjected to an elevated temperature in the range of 140° C.-180° C., it undergoes degradation reaction to yield cyclopentadiene which in turn reacts with maleic anhydride through a Diels-Alder reaction to yield nadic anhydride. With further addition of a diol and additional dicarboxylic acid, an ester oligomer is formed. The R' in the diol and R" in the dicarboxylic acid are represented by aliphatic, cycloaliphatic, araliphatic and aromatic hydrocarbon groups of 1 to 20 carbon atoms and n in the ester oligomer preferably 1 to 10. The resulting ester oligomer has a single nadic acid incorporated in the middle and the terminal ends are represented by hydroxyl group.

In another embodiment of the present invention, cyclopentadiene is used in place of dicyclopentadiene to produce a modified ester oligomer. Dicyclopentadiene at elevated temperature in the range of 140° C.-180° C. degrades and results in the formation of cyclopentadiene. In one aspect of this invention, it is possible to produce cyclopentadiene in situ from dicyclopentadiene by raising the temperature to 140° C.-180° C. range. In another aspect of this invention, cyclopentadiene can be procured from a commercial supplier. Cyclopentadiene and maleic anhydride will undergo a Diels-Alder reaction to yield a nadic anhydride as shown in FIG. 4. Nadic anhydride can be incorporated into the back bone of an ester oligomer as shown again FIG. 4.

Figure 5:
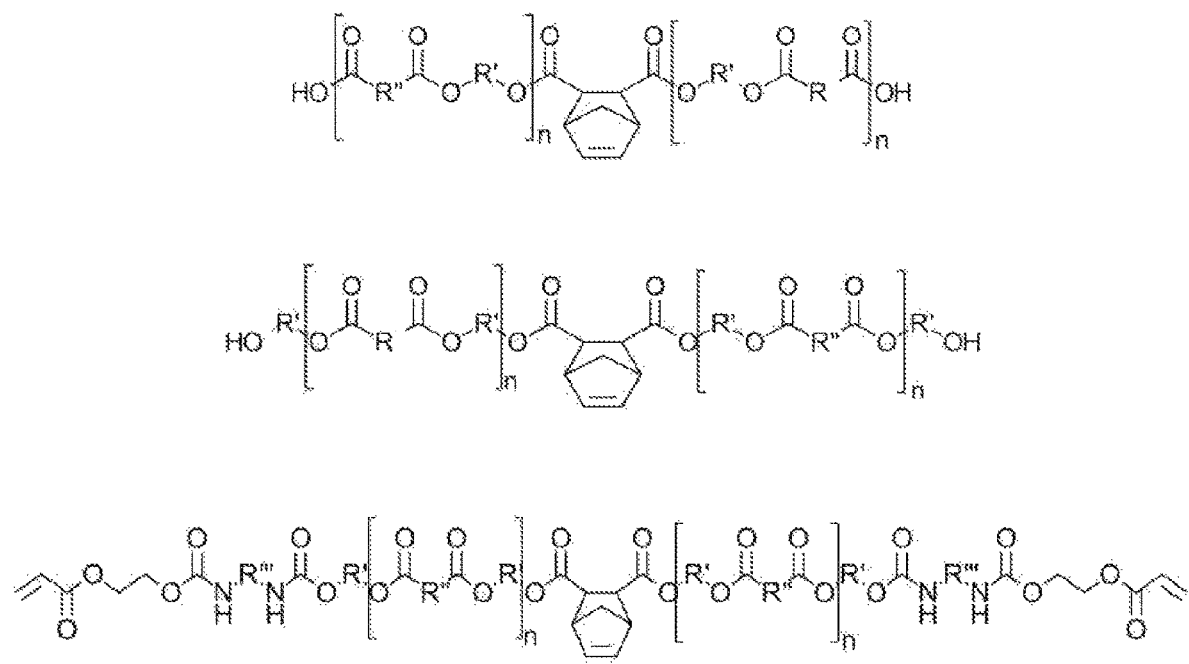
FIG. 5. Depending on the relative proportion of the diol and dicarboxylic acid in the reaction mixture used in the formation of ester oligomer from maleic anhydride-nadic anhydride, either an ester oligomer with acid functional group (shown on the top) or an ester oligomer with hydroxyl functional group (shown in the middle) are formed. Under certain experimental conditions as described in the specification, ester oligomer with acrylate functional group (shown in the bottom) is produced with the inclusion of isophorone diisocyanate and 2-hydroxyethyl acrylate in the reaction medium.

As illustrated in FIG. 5, it is also possible to prepare nadic acid modified ester oligomers with different functional groups. In one aspect of the present invention, it is possible to have a hydroxyl functional group at the end of the nadic acid modified ester oligomer by means of using a higher ratio of diol to carboxylic acid in the reaction mixture. In another aspect of the present invention, it is possible to have a carboxylic acid functional group at the end of nadic acid modified ester oligomer by means of using a higher ratio of carboxylic acid to diol in the reaction mixture.

The present invention also provides a procedure to introduce an acrylate functional group at the end of the nadic acid modified ester oligomer (FIG. 5). In the first step of this procedure to introduce an acrylate functional group at the end of the nadic acid modified ester oligomer, a nadic acid modified ester oligomer with hydroxyl functional group is synthesized. In the second step of the preparation of a nadic acid modified ester oligomer with an acrylate functional group, the ester oligomer from the first step is reacted with isophorone diisocyanate and 2-hydroxyethyl acrylate to obtain a nadic acid modified ester oligomer with an acrylate functional group as shown in FIG. 5.

Figure 6:
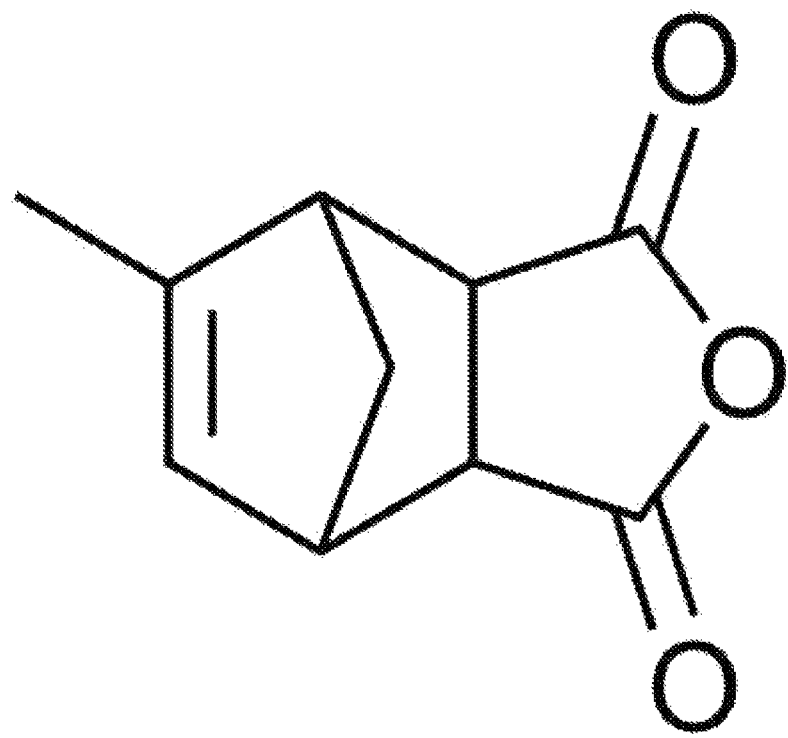
FIG. 6. Structure of methyl nadic anhydride.
Figure 7:
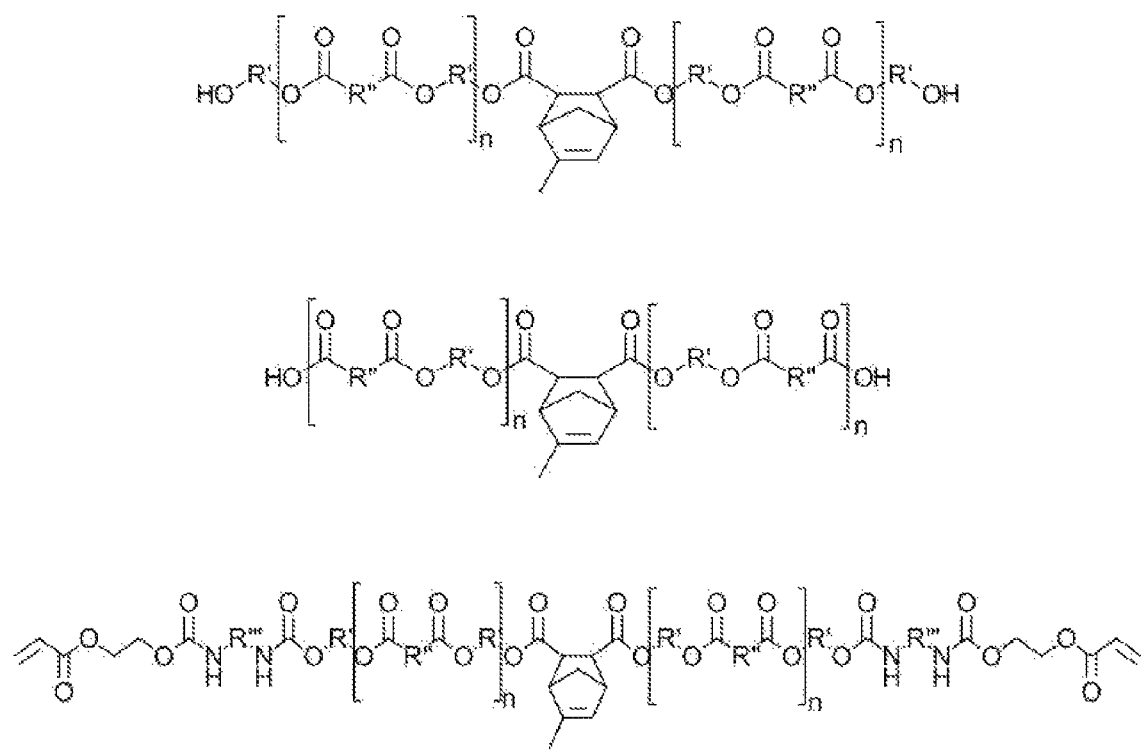
FIG. 7. Depending on the relative proportion of the diol and dicarboxylic acid in the reaction mixture used in the formation of ester oligomer from malic anhydride-methyl nadic anhydride, either a ester oligomer with acid functional group (shown on the top) or a ester oligomer with hydroxyl functional group (shown in the middle) are formed. Under certain experimental conditions as described in the specification, ester oligomer with acrylate functional group (shown in the bottom) is produced with the inclusion of isophorone diisocyanate and 2-hydroxyethyl acrylate in the reaction medium.

In yet another embodiment of the present invention, a cyclopentadiene derivative can be used to modify the ester oligomers. Cyclopentadiene can be methylated to yield methyl cyclopentadiene which is reacted with maleic acid in a Diels-Alder reaction to produce methyl nadic anhydride as shown in FIG. 6 which can be incorporated into the back bone of an ester oligomer to yield a modified ester oligomer as shown in FIG. 7. Alternatively, the methyl nadic anhydride is derived from nadic anhydride by methylation reaction.

Methyl nadic anhydride can be used as a starting material to produce a hydroxyl-bearing methyl nadic acid modified ester oligomer via polyester synthesis pathway using a glycol and a diacid as shown in FIG. 7. By means of altering the ratio of diol and carboxylic acid in the reaction leading to the synthesis of ester oligomer, one can synthesize a methyl nadic acid modified ester oligomer with acid functional groups at both ends.

The present invention also provides a procedure to introduce an acrylate functional group at the end of the methyl nadic acid modified ester oligomer (FIG. 7). In the first step of this procedure to introduce an acrylate functional group at the end of the methyl nadic acid modified ester oligomer, a methyl nadic acid modified ester oligomer with hydroxyl functional group is synthesized. In the second step of the preparation of a methyl nadic acid modified ester oligomer with an acrylate functional group, the ester oligomer from the first step is reacted with diisocyanate and acrylate to obtain a methyl nadic acid modified ester oligomer with an acrylate functional group as shown in FIG. 7.

Maleic acid-dicyclopentadiene adduct, nadic anhydride and methyl nadic anhydride initiate oligomer formation in the presence of appropriate amount of a diol and a dicarboxylic acid even in the absence of any polymerization catalyst. Presence of metal catalysts such a nickel and tin catalysts would enhance the polymerization reaction.

Any one of the modified ester oligomers prepared according to the present invention is formulated either alone or in any desirable combination with at least one diluent monomer, an epoxy acrylate or a urethane acrylate and a photoinitiator to yield a polyester resin curable with ultraviolet or electron beam radiation for coating applications. For example a polyester resin formulation can be based on a single modified ester oligomer such as dicyclopentadiene modified ester oligomer or nadic acid modified ester oligomer or methyl nadic acid modified ester oligomer. Alternatively, dicyclopentadiene modified ester oligomer can be combined with nadic acid modified ester oligomer or methyl nadic acid modified oligomer in different proportion to produce a polyester resin. In another aspect of the present invention, all three modified ester oligomers described in the present invention can be combined in specific proportion to produce a polyester resin useful in coating applications. The list of diluent monomers suitable for formulating a polyester resin for coating application includes styrene, p-vinyltoluene, a-methylstyrene, methyl acrylate, methyl methacrylate, diallyl phthalate and triallyl cyanurate, in addition to any number of similar monomerss containing vinyl unsaturation. Furthermore, there are at least 50 commercially available acrylate and methacrylate monomers and any one of them is suitable for use in the present invention. Representative examples of commercially available acrylate and monomers include but not restricted to MIRAMER M4004, POLYESTER ACRYLATE 03-849, GENOMER* 2252/TP20, Trimethylolpropane Trimethacrylate (TMPTMA), 2-Ethylhexyl acrylate and Isobornyl Acrylate (IBOA).

Polyester resins prepared according to the present invention for coating applications are applied on the substrate and are subjected to curing. In general, the curing is achieved using a radical initiator and a promoter. A wide variety of initiators are available for curing polyester resins. A number of peroxides including ketone peroxides (methylethylketone peroxide, acetylacetone peroxide), hydro peroxides (cumene peroxide), diacyl peroxides (dibenzoyl peroxides), dialkyl peroxides (dicumyl peroxide, tert-butylcumyl peroxide), alkyl peresters (tert-butylperoxy-2-ethylhexanoate, tert-butylperoxybenzoate, tert-amylperoxy benzoate, tert-hexylperoxybenzoate) and percabonates (bis (4-tert-butylcyclohexyl) peroxydicarbonate) are suitable for curing the polyesters resins of the present invention. These peroxide curing agents can be used alone or in combination. A person skilled in the art will be able to use the curing agents in a desirable combination.

In general, coatings of unsaturated polyester resins are cured with light sensitive photoinitiators. The list of common photoinitiators include benzoin methyl ether, 2,2-dimethoxy-phenylacetophenone, 2-hydroxy-2-methylphenylpropane-1-one, α-hydroxy-acetoophenone, bis(2,6-dimethoxybenzoyl)-2,4,4,-trimethylpentylphosphate oxide, 2-hydroxy-2-methyl-1phenyl-propan-1-one, 2,4,6-Trimethylbenzoyldiphenylphosphine oxide and Bis(2,6-dicholorobenzoyl)-(4-propylphenyl)phosphine oxide. Photointiators can be used alone or in combination with peroxide initiators. A person skilled in the art will be able to use the light sensitive photoinitiators in a desirable combination.

The cured samples can be evaluated using the techniques well-known in the art. Although the degree of curing is easily measured through certain qualitative methods such as fingernail marring or film integrity after thumb twist, a number a quantitative measure of curing efficiency is possible. For example, the measurement of disappearance of acrylate C=C bonds at 1636 cm$^{-1}$ using Fourier transform infrared spectroscopy is the gold standard in assessing the curing efficiency. In addition, a number of other quantitative tests such as cross-hatch adhesion, flexibility, adhesion, hardness and impact resistance as provide under Experimental Section can be followed to quantify the curing efficiency and the suitability of the modified-polyester resins of the present invention for coating applications.

EXPERIMENTAL SECTION

General Remarks

Determination of acid value for ester oligomers: The acid value of ester oligomers was determined using the following protocol. Approximately 1.00-2.00 grams of sample was weighed into an Erlenmeyer flask and approximately 75 milliliters of toluene was added. The solution was stirred until the sample completely dissolved. The resulting solution was titrated immediately with 0.1N potassium hydroxide solution in the presence of a pH indicator dye such as phenolphthalein. The amount of 0.1N potassium hydroxide solution required to reach a pink end-point was recorded in milliliters and the acid value of the sample was determined using the following equation: Acid Value=[v×N×56.1]/sample weight, where v is the volume of the potassium hydroxide solution used and N is the normality of the potassium hydroxide solution used.

Determination of hydroxyl value of ester oligomers: The hydroxyl value of ester oligomers is determined using the following protocol. 1.0 gram of dimethyl amino pyridine is dissolved in 85 ml of toluene in an Erlenmeyer flask followed by the addition of 15 ml of acetic anhydride. This solution is referred as DMAP solution and is stable only for three hours post preparation. In another flask 40 ml of dibutylamine is added to 500 ml of toluene and the resulting solution is referred as DBA solution. In determining hydroxyl value, 0.5 to 1.0 gram of test sample is added to 50 ml of toluene in a 250 ml glass-stoppered Erlenmeyer flask and placed on a stirring hot plate until the test sample was fully dissolved. Once the sample is completely dissolved, 5 ml of DMAP solution is added and the flask is placed in a 60° C. oven for exactly 15 minutes followed by the addition of 20 ml of DBA solution while stirring to yield a "sample solution". Similar procedure is followed to prepare a "blank solution" where no test sample is added. To the "sample" and "blank" solutions 2 drops of Bromophenol blue indicator is added followed by titration with 0.5N HCL until the purple color of the solution turns to bright yellow endpoint. The total volume of 0.5N hydrochloric acid added to reach the endpoint is noted in the titration for "samples solution" and "blank solution". The hydroxyl value of the test sample is calculated using the following formula: Hydroxyl value=[(volume of 0.5N hydrochloric acid added to the "blank solution"—volume of 0.5N hydrochloric acid added to the "sample solution")×28.05]/sample weight.

Determination of percent isocyanate: The percent isocyanate is determined using the following protocol. In a flask, 40 ml of dibutylamine is added to 500 ml of toluene and the resulting solution is referred as DBA solution. In determining percent isocyanate, 1.0-3.0 grams of test sample is added to 50 ml of toluene in a 250 ml Erlenmeyer flask and placed on a stirring plate until the test sample is fully dissolved. Once the sample is completely dissolved, 2 drops of bromophenol blue indicator is added followed by titration with 0.5N hydrochloric acid in isopropanol until the purple color of the solution turns to bright yellow endpoint. A "blank" containing only 50 mL toluene and the bromophenol blue indicator is prepared and titrated in the same fashion. The total volumes of 0.5N hydrochloric acid added to reach the endpoint for both the "blank" and "sample" solutions are noted. The percent isocyanate of the test sample is calculated using the following formula: Percent isocyanate=[(volume of 0.5N hydrochloric acid added to the "blank"—volume of 0.5N hydrochloric acid added to the "sample")×2.101]/sample weight.

Cross-hatch adhesion test: For hard surfaces, a cross-hatch adhesion test was performed per ASTM D3359 standards.

Identifying bio-based 1,3-propanediol and succinic acid: The bio-based succinic acid and 1,3-propanediol manufactured according to the present invention can be distinguished from succinic acid and 1,3 propanediol manufactured following the traditional methods involving petroleum feedstock on the basis of their carbon 14 content following the method ASTM-D6866 provided by American Society of Testing and Materials. Cosmic radiation produces $^{14}C$ ("radiocarbon") in the stratosphere by neutron bombardment of nitrogen. $^{14}C$ atoms combine with oxygen atom in the atmosphere to form heavy $^{14}CO_2$, which, except in the radioactive decay, is indistinguishable from the ordinary carbon dioxide. $CO_2$ concentration and the $^{14}C/^{12}C$ ratio is homogeneous over the globe and because it is used by the plants, the ratio $^{14}C/^{12}C$ is retained by the biomass while the content of $^{14}C$ in the fossil materials, originally derived from photosynthetic energy conversion, has decayed due to its short half-life of 5730 years. By means of analyzing the ratio of $^{14}C$ to $^{12}C$, it is possible to determine the ratio of fossil fuel derived carbon to biomass-derived carbon. International Patent Application Publication No. WO2009/155085 A2 and U.S. Pat. No. 6,428,767 provide details about the use of ASTM-D6866 method for determining percent of biomass-derived carbon content in a chemical composition. The details related carbon dating disclosed in the U.S. Pat. No. 6,428,767 is incorporated herein by reference. An application note from Perkin Elmer entitled "Differentiation between Fossil and Biofuels by Liquid Scintillation Beta Spectrometry-Direct Method" provides details about the methods involving ASTM Standard D6866.

Commercial samples used in the comparative examples: In the experiments aimed at comparing the adhesion performance of polyester resin prepared in the instant invention with the commercially available coating materials, the following four samples were used. (1) MYR 113-43, a dicyclopentadiene-modified polyester resin prepared in the instant invention. (2) Dystar DCPD Oligomer (Dystar LP, Reidsville, N.C.); Dystar DCPD contains dicyclopentadiene, maleic anhydride, diethylene glycol and ethylene glycol. (3) GENOMER*2252/TP20 from Rahn USA Corp. It is Bisphenol A epoxy acrylate in 20% TPGDA (Tripropylene Glycol Di Acrylate). It is a resin for radically curable inks, coating and adhesives. This product is used in the following applications: screen inks and varnishes; flexo inks and varnishes; letterpress inks; coatings for board and plastic; wood coatings; and adhesives. (4) Polyester Acrylate 03-849 from Rahn USA Corp. It is a polyester acrylate resin for radically curable inks, coatings and adhesives. The product provides good adhesion onto various substrates such as PVC, polyolefin, polyester and polystyrene. It is recommended for use in printing inks and varnishes, overprint varnishes, plastic coatings and wood and industrial coatings. MYR 113-43 was cured using UV irradiation as in the Example 1.

EXAMPLE 1

Preparation of Dicyclopentadiene-Modified Ester Oligomer Batches 1 Through 23

The sources of the reagents in the preparation of dicyclopentadiene-modified oligomer batches 1 through 23 were as follows: Dicyclopentadiene—Sigma Aldrich; Maleic anhydride—Sigma Aldrich; bio-based 1,3-propanediol—DuPont (Susterra), petroleum based succinic acid—Kawasaki; bio-based succinic acid-Myriant (LP140720-11, LP150429-2, and LP151202-2); Cardura E10P—Momentive; trimethylol propane—Alfa Aesar; and Pripol 1010-LQ (GD)—Croda.

Batch 1 (MYR 093-62) was prepared by adding 107.72 grams of dicyclopentadiene to 15.40 grams of water under nitrogen and heating the mixture to 80° C. 79.89 grams of maleic anhydride was added gradually to the mixture of dicyclopentadiene and water under nitrogen and was held at 125° C. for 2 hours. At the end of incubation at 125° C. for two hours, 100.78 grams of 1,3-propanediol and 96.21 grams of petroleum based succinic acid were added and gradually heated to 205° C. After maintaining the solution at 205° C. for 90 minutes, the solution was split into two halves and to one half, 26 grams Cardura E10P glycidyl ester of Versatic Acid (Momentive) was added to achieve improved chemical resistance. The acid value for the portion without Cardura addition was 25.02 and the acid value for the portion containing Cardura was 9.7.

Batch 2 (MYR 093-66) was prepared by adding 190.4 grams of dicyclopentadiene to 15.64 grams of water under nitrogen and heating the mixture to 80° C. 81.14 grams of maleic anhydride was added gradually to the mixture of dicyclopentadiene and water under nitrogen and was held at 125° C. for 2 hours. At the end of incubation at 125° C. for two hours, 94.4 grams of 1,3-propanediol, 85.50 grams of petroleum based succinic acid, 13.88 grams of trimethylol propane and 59.21 grams of Pripol 1010=LQ (GD) were added and gradually heated to 205° C. The acid value of the final oligomer preparation was 22.85. Pripol was added for increasing the flexibility but the molecular weight of the oligomer was too high and reactivity was too low.

Batch 3 (MYR 093-69) was prepared by adding 106.17 grams of dicyclopentadiene to 15.18 grams of water under nitrogen and heating the mixture to 80° C. 78.74 grams of maleic anhydride was added gradually to the mixture of dicyclopentadiene and water under nitrogen and was held at 125° C. for 2 hours. At the end of incubation at 125° C. for two hours, 91.65 grams of 1,3-propanediol, 94.83 grams of petroleum based succinic acid, and 13.47 grams of trimethylolpropane were added and gradually heated to 205° C. The acid value of the final oligomer preparation was 24.1. Trimethylol propane was added to increase functionality but the molecular weight of the oligomer was too high and reactivity was too low.

Batch 4 (MYR 113-3) was prepared by adding 107.46 grams of dicyclopentadiene to 15.98 grams of water under nitrogen and heating the mixture to 80° C. 79.84 grams of maleic anhydride was added gradually to the mixture of dicyclopentadiene and water under nitrogen and was held at 125° C. for 2 hours. At the end of incubation at 125° C. for two hours, 92.6 grams of 1,3-propanediol, 95.52 grams of bio-based succinic acid and 14.06 grams of trimethylolpropane were added and gradually heated to 205° C. The acid value of the final oligomer preparation was 21.3.

Batch 5 (MYR 113-14) was prepared by adding 663.5 grams of dicyclopentadiene to 94.8 grams of water under nitrogen and heating the mixture to 80° C. 492.1 grams of maleic anhydride was added gradually to the mixture of dicyclopentadiene and water under nitrogen and was held at 125° C. for 2 hours. At the end of incubation at 125° C. for two hours, 572.78 grams of 1,3 propanediol, 592.62 grams of petroleum based succinic acid, and 84.2 grams of trimethylolpropane were added and gradually heated to 205° C. The acid value of the final oligomer preparation was 22.4. This is a scale up of Batch 3.

Batch 6 (MYR 113-16) was prepared by adding 663.48 grams of dicyclopentadiene to 94.85 grams of water under nitrogen and heating the mixture to 80° C. 492.1 grams of maleic anhydride was added gradually to the mixture of dicyclopentadiene and water under nitrogen and was held at 125° C. for 2 hours. At the end of incubation at 125° C. for two hours, 572.78 grams of 1,3 propanediol, 592.62 grams of petroleum based succinic acid, and 84.16 grams of trimethylolpropane were added and gradually heated to 205° C. The acid value of the final oligomer preparation was 22.7. This is a repeat of Batch 5, the scale up of Batch 3.

Batch 7 (MYR 113-18) was prepared by adding 663.48 grams of dicyclopentadiene to 94.85 grams of water under nitrogen and heating the mixture to 80° C. 492.1 grams of maleic anhydride was added gradually to the mixture of dicyclopentadiene and water under nitrogen and was held at 125° C. for 2 hours. At the end of incubation at 125° C. for two hours, 572.78 grams of 1,3-propanediol, 592.62 grams of petroleum based succinic acid, and 84.16 grams of trimethylolpropane were added and gradually heated to 205° C. The acid value of the final oligomer preparation was 29.5. This is a repeat of Batch 5, the scale up of Batch 3.

Batch 8 (MYR 113-20) was prepared by adding 663.48 grams of dicyclopentadiene to 94.85 grams of water under nitrogen and heating the mixture to 80° C. 492.10 grams of maleic anhydride was added gradually to the mixture of dicyclopentadiene and water under nitrogen and was held at 125° C. for 2 hours. At the end of incubation at 125° C. for two hours, 572.78 grams of 1,3-propanedol, 592.78 grams of bio-based succinic acid and 84.16 grams of trimethylolpropane were added and gradually heated to 205° C. The acid value of the final oligomer preparation was 24.0. This is a scale up of Batch 4.

Batch 9 (MYR 113-22) was prepared by adding 176.52 grams of dicyclopentadiene to 25.23 grams of water under nitrogen and heating the mixture to 80° C. 130.92 grams of maleic anhydride was added gradually to the mixture of dicyclopentadiene and water under nitrogen and was held at 125° C. for 2 hours. At the end of incubation at 125° C. for two hours, 67.32 grams of trimethylolpropane were added and gradually heated to 205° C. The acid value of the final preparation was 24.4. There was no addition of 1,3-propanediol and succinic acid. The resulting product was solid at room temperature.

Batch 10 (MYR 113-24) was prepared by adding 135.33 of dicyclopentadiene to 19.35 grams of water under nitrogen and heating the mixture to 80° C. 100.38 grams of maleic anhydride was added gradually to the mixture of dicyclopentadiene and water under nitrogen and was held at 125° C. for 2 hours. At the end of incubation at 125° C. for two hours, 60.44 grams of bio-based succinic acid and 84.51 grams of 1,3-propanediol was added and gradually heated to 205° C. The acid value of the final preparation was 22.5.

Batch 11 (MYR 113-43) was prepared by adding 845.5 grams of dicyclopentadiene to 120.87 grams of water under nitrogen and heating the mixture to 80° C. 627.1 grams of maleic anhydride was added gradually to the mixture of dicyclopentadiene and water under nitrogen and was held at 125° C. for 2 hours. At the end of incubation at 125° C. for two hours, 486.03 grams of 1,3-propanediol, 377.6 grams of bio-based succinic acid and 42.9 grams of trimethylolpropane were added and gradually heated to 205° C. The acid value of the final oligomer preparation was 24.7.

In a representative preparation of Batch 11 material, 845.5 grams of dicyclopentadiene and 120.87 grams of water were charged into a 3-L round bottom flask. Agitation of the components in the flask was started under nitrogen blanket and the contents were slowly warmed to reach a temperature of 80° C. After reaching 80° C., 627.10 grams of maleic anhydride was slowly added into the mixture while maintaining the temperature below 125° C. After the complete addition of maleic anhydride, the temperature was raised to 125° C. and maintained at that temperature for 2 hours. At the end of 2 hours of incubation, 486.03 grams of 1,3-propanediol from DuPont Tata and Lyle (Susterra™), 42.90 grams of trimethylolpropane (TMP) and 377.60 grams of Myriant's Bio-succinic acid were added at once and the heating was increased to 205° C. and the reaction vessel was maintained at that temperature until the acid value of the content inside the glass flask reached an acid value in the range of 22-28.

Batch 12 (MYR 113-58) was prepared by adding 1010 grams of dicyclopentadiene to 44 grams of water under nitrogen and heating the mixture to 80° C. 747 grams of maleic anhydride was added gradually to the mixture of dicyclopentadiene and water under nitrogen and was held at 125° C. for 2 hours. At the end of incubation at 125° C. for two hours, 619 grams of 1,3-propanediol was added and gradually heated to 205° C. The acid value of the final preparation was 5.63. This preparation contained OH functional group suitable for urethane synthesis.

Batch 13 (MYR 113-68) was prepared by adding 847 grams of dicyclopentadiene to 121 grams of water under nitrogen and heating the mixture to 80° C. 627.10 grams of maleic anhydride was added gradually to the aqueous solution of dicyclopentadiene and water under nitrogen and was held at 125° C. for 2 hours. At the end of incubation at 125° C. for two hours, 486.03 grams of 1,3-propanediol, 377.6 grams of bio-based succinic acid and 42.90 grams of trimethylolpropane were added and gradually heated to 205° C. The acid value of the final oligomer preparation was 24.7. This is a repeat of Batch 11.

Batch 14 (MYR 160-3) was prepared by adding 140.28 grams of dicyclopentadiene to 20.05 grams of water under nitrogen and heating this mixture to 80° C. 104.04 grams of maleic anhydride was added gradually to the mixture of dicyclopentadiene and water under nitrogen and was held at 125° C. for 2 hours. At the end of incubation at 125° C. for two hours, 69 grams of ethylene glycol, 63 grams of bio-based succinic acid and 7.12 grams of trimethylol propane were added and gradually heated to 205° C. The acid value of the final oligomer preparation was 24.1.

Batch 15 (MYR 113-178) was prepared by adding 125.6 grams of dicyclopentadiene to 17.96 grams of water under nitrogen and heating this mixture to 80° C. 93.16 grams of maleic anhydride was added gradually to the mixture of dicyclopentadiene and water under nitrogen and was held at 125° C. for 2 hours. At the end of incubation at 125° C. for two hours, 100.82 grams of diethylene glycol, 56.09 grams of bio-based succinic acid and 6.37 grams of trimethylolpropane were added and gradually heated to 205° C. The acid value of the final oligomer preparation was 24.9.

Batch 16 (MYR 159-13) was prepared by adding 132.8 grams of dicyclopentadiene to 18.7 grams of water under nitrogen and heating this mixture to 80° C. 103 grams of maleic anhydride was added gradually to the mixture of dicyclopentadiene and water under nitrogen and was held at 125° C. for 2 hours. At the end of incubation at 125° C. for two hours, 90 grams of 1,4-butanediol, 59 grams of bio-based succinic acid and 6.6 grams of trimethylolpropane were added and gradually heated to 205° C. The acid value of the final oligomer preparation was 25.0.

Batch 17 (MYR 113-181) was prepared by adding 135 grams of dicyclopentadiene to 18.67 grams of water under nitrogen and heating this mixture to 80° C. 96.86 grams of maleic anhydride was added gradually to the mixture of dicyclopentadiene and water under nitrogen and was held at 125° C. for 2 hours. At the end of incubation at 125° C. for two hours, 79 grams of 1,3-propanediol, 73.3 grams of adipic acid and 6.63 grams of trimethylolpropane were added and gradually heated to 205° C. The acid value of the final oligomer preparation was 25.5.

Batch 18 (MYR 160-33) was prepared by adding 157 grams of dicyclopentadiene to 23 grams of water under nitrogen and heating this mixture to 80° C. 116 grams of maleic anhydride was added gradually to the mixture of dicyclopentadiene and water under nitrogen and was held at 125° C. for 2 hours. At the end of incubation at 125° C. for two hours, 105.6 grams of trimethylol propane were added and gradually heated to 210° C. When the acid value fell to 8.5, the temperature was set at 130° C. and 15.3 grams of Cardura E10P were added. The acid value of the final oligomer preparation was 1.553 and the final hydroxyl number was 144.2.

Batch 19 (MYR 160-61) was prepared by premixing 197 grams MYR 160-33 with 157.5 grams hexanediol diacrylate and warming to thoroughly blend. 106.9 grams isophorone diisocyanate, 0.175 grams butylated hydroxytoluene, 0.175 grams toluhydroquinone, and 0.10 grams dibutyltin dilaureate were charged to a reaction vessel and heated under air to 70° C. 56 grams 2-hydroxyethyl acrylate was charged to an addition funnel over the reaction vessel. When the isophorone diisocyanate reached 70° C., the 2-hydroxyethyl acrylate was added dropwise to control the exotherm below 80° C. After 2-hydroxyethyl acrylate addition was complete, the reaction was stirred for 5 minutes, before adding 338 grams of the premixed MYR 160-33 and hexanediol diacrylate. The temperature was gradually increased to a maximum of 70° C. until the percent isocyanate fell below 0.1%.

Batch 20 (MYR 113-83) was prepared by adding 740 grams of dicyclopentadiene to 107 grams of water under nitrogen and heating this mixture to 80° C. 550 grams of maleic anhydride was added gradually to the mixture of dicyclopentadiene and water under nitrogen and was held at 125° C. for 2 hours. At the end of incubation at 125° C. for two hours, 465 grams of 1,3-propanediol and 660 grams of bio-based succinic acid were added and gradually heated to 205° C. The acid value of the final oligomer preparation was 115.7.

Batch 21 (MYR 113-159) was prepared by adding 1008 grams of dicyclopentadiene to 145 grams of water under nitrogen and heating this mixture to 80° C. 748 grams of maleic anhydride was added gradually to the mixture of dicyclopentadiene and water under nitrogen and was held at 125° C. for 2 hours. At the end of incubation at 125° C. for two hours, 617 grams of 1,3-propanediol were added and gradually heated to 205° C. The acid value of the final oligomer preparation was 3.2.

Batch 22 (MYR 160-12) was prepared by premixing 408.8 grams MYR 113-159 with 89.3 grams hexanediol diacrylate and warming to thoroughly blend. 246.8 grams isophorone diisocyanate, 0.215 grams butylated hydroxytoluene, 0.215 grams toluhydroquinone, and 0.17 grams dibutyltin dilaureate were charged to a reaction vessel and heated under air to 70° C. 129.3 grams 2-hydroxyethyl acrylate was charged to an addition funnel over the reaction vessel. When the isophorone diisocyanate reached 70° C., the 2-hydroxyethyl acrylate was added dropwise to control the exotherm below 80° C. After 2-hydroxyethyl acrylate addition was complete, the reaction was stirred for 5 minutes, before adding 474 grams of the premixed MYR 113-159 and hexanediol diacrylate. The temperature was gradually increased to a maximum of 70° C. until the percent isocyanate fell below 0.1%.

Batch 23 (MYR 160-8) was prepared by premixing 377 grams MYR 113-159 with 84 grams diethyleneglycol dimethacrylate and warming to thoroughly blend. 228 grams isophorone diisocyanate, 0.20 grams butylated hydroxytoluene, 0.20 grams toluhydroquinone, and 0.16 grams dibutyltin dilaureate were charged to a reaction vessel and heated under air to 70° C. 133.3 grams 2-hydroxyethyl methacrylate was charged to an addition funnel over the reaction vessel. When the isophorone diisocyanate reached 70° C., the 2-hydroxyethyl acrylate was added dropwise to control the exotherm below 80° C. After 2-hydroxyethyl acrylate addition was complete, the reaction was stirred for 5 minutes, before adding 474 grams of the premixed MYR 113-159 and diethyleneglycol dimethacrylate. The temperature was gradually increased to a maximum of 70° C. until the percent isocyanate fell below 0.1%.

EXAMPLE 2

Preparation of Nadic-Modified Ester Oligomer

In a representative preparation of nadic-modified ester oligomer, 272 grams of methyl nadic anhydride (Sigma Co.) 356 grams of 1,3-propanediol from DuPont Tata and Lyle (Susterra™), 180.2 grams of Myriant's Bio-succinic acid were added at once to a 1-L round bottom flask and the temperature was increased to 205° C. and held at that temperature until an acid value of around 25 is obtained. Then 0.2 grams of Reaxis C256 organotin catalyst (Reaxis) is added and temperature is held at 205° C. until a desirable acid value is obtained. In another aspect of this invention, the commercial supply of methyl nadic anhydride can be replaced with nadic anhydride.

In another aspect of this example, the nadic anhydride is produced within the 3-L round bottom flask from dicyclopentadiene in the following way. 845.5 grams of dicyclopentadiene, 120.87 grams of water, 627.10 grams of maleic acid anhydride, 486.03 grams of 1,3-propanediol from DuPont Tata and Lyle (Susterra™), 42.90 grams of trimethylolpropane (TMP) and 377.60 grams of Myriant's Bio-succinic acid were added at once into a 3-L round bottom flask and the temperature was increased to 205° C. and maintained at that temperature till the desired acid value is reached.

EXAMPLE 3

UV Curing of Dicyclopentadiene-Modified Ester Oligomer MYR 113-43

Adhesion performance experiments were conducted on ester oligomer MYR 113-43 against two commercial acrylate-based oligomers test standards namely GENOMER 2252/TP20 and Polyester Acrylate 03-849 (both from Rahn, USA) and a DCPD containing oligomer namely Dystar DCPD (Dystar, LP, Reidsville, N.C., USA). Dystar DCPD contains dicyclopentadiene, maleic anhydride, diethylene glycol and ethylene glycol. Appropriate formulations were prepared as described in the Comparative Examples 1-5 below and equilibrated for 24 hours. Each blend was then applied to the top of a rectangular strip of substrate taped onto a piece of paper. The applied coating was then drawn with a 3 Meyer rod to obtain a uniform coating thickness. The draw-down was cured using a UV unit (Sugarman's equipment) with a medium pressure mercury lamp at 250-500 WPI intensity. Curing energy was measured using a radiometer. Samples were run through the UV unit at a running speed of 100 feet per minute. Each coated surface was passed through three times. Tape adhesion test was performed per ASTM standards. For flexible, cuttable substrates such as film, it was straight adhesion test with no cross-hatch. For hard surfaces, a cross hatch adhesion test was performed per ASTM D3359 standard.

COMPARATIVE EXAMPLE 1

In this experiment, 35 grams of each of the four different ester oligomers namely, MYR 113-43, Dystar DCPD oligomer, GENOMER* 2252/TP20 and Polyester Acrylate 03-849 were formulated with 38 grams of isobornyl acrylate (Allnex—UV/EB Curable Resins), 22 grams of MIRAIVIER M4004 polyetherpolytetraacrylate (Rahn USA Corp.) and 5 grams of LTD (a photoinitiator from Rahn USA Corp.) and subjected to adhesion test on the polyester, polypropylene, steel, polyethylene and glass surfaces. 3/10 millimeter thick coating was applied and run through the UV radiation unit three times at the belt speed of 100 ft./min. The results of this adhesion testing with four different polyester resins are shown in the Table 1. A "Pass" with no number indicates 100% adhesion. A number indicates an approximate amount of coating left on the substrate. Thus a "Pass" with 95% means 95% of the coating stayed with the substrate while 5% came off on the tape. A "Fail" with 50% means an even distribution of coating on both the substrate and the tape.

COMPARATIVE EXAMPLE 2

In this experiment, 35 grams of each of the four different ester oligomers namely, MYR 113-43, Dystar DCPD oligomer, GENOMER* 2252/TP20 and Polyester Acrylate 03-849 were formulated with 33 grams of isobornyl acrylate (Allnex—UV/EB Curable Resins), 22 grams of MIRAIVIER M4004 polyetherpolytetraacrylate (Rahn USA Corp.), 5 grams of LTD (Rahn USA Corp.) and 5 gram of G*40 (Genorad 40, Rahn USA Corp.) and subjected to adhesion test on the polyester, polypropylene, steel, polyethylene and glass surfaces. 3/10 millimeter thick coating was applied and run through the UV radiation unit three times at the belt speed of 100 ft./min. The results of this adhesion testing with four different polyester resins are shown in the Table 2. A "Pass" with no number indicates 100% adhesion. A number indicates an approximate amount of coating left on the substrate. Thus a "Pass" with 95% means 95% of the coating stayed with the substrate while 5% came off on the tape. A "Fail" with 50% means an even distribution of coating on both the substrate and the tape. The difference between Example 1 and Example 2 is the presence of G*40 as an additional component in Example 2.

COMPARATIVE EXAMPLE 3

In this experiment, 35 grams of each of the four different ester oligomers namely, MYR 113-43, Dystar DCPD oligomer, GENOMER* 2252/TP20 and Polyester Acrylate 03-849 were formulated with 38 grams of 2-ethylhexyl acrylate (DOW), 22 grams of MIRAIVIER M4004 polyetherpolytetraacrylate (Rahn USA Corp.) and 5 grams of LTD (Rahn USA Corp.) and subjected to adhesion test on the polyester, polypropylene, steel, polyethylene and glass surfaces. 3/10 millimeter thick coating was applied and run through the UV radiation unit three times at the belt speed of 100 ft./min. The results of this adhesion testing with four different polyester resins are shown in the Table 3. A "Pass" with no number indicates 100% adhesion. A number indicates an approximate amount of coating left on the substrate. Thus a "Pass" with 95% means 95% of the coating stayed with the substrate while 5% came off on the tape. A "Fail" with 50% means an even distribution of coating on both the substrate and the tape.

COMPARATIVE EXAMPLE 4

In this experiment, 35 grams of each of the four different ester oligomers namely, MYR 113-43, Dystar DCPD oligomer, GENOMER* 2252/TP20 and Polyester Acrylate 03-849 were formulated with 33 grams of 2-ethylhexyl acrylate (DOW), 22 grams of MIRAMER M4004 polyetherpolytetraacrylate (Rahn USA Corp.), 5 grams of LTD (Rahn USA Corp.) and 5 grams of G*40 (Genorad 40, Rahn USA Corp.) and subjected to adhesion test on the polyester, polypropylene, steel, polyethylene and glass surfaces. $3/10$ millimeter thick coating was applied and run through the UV radiation unit three times at the belt speed of 100 ft./min. The results of this adhesion testing with four different polyester resins are shown in the Table 4. A "Pass" with no number indicates 100% adhesion. A number indicated an approximate amount of coating left on the substrate. Thus a "Pass" with 95% means 95% of the coating stayed with the substrate while 5% came off on the tape. A "Fail" with 50% means an even distribution of coating on both the substrate and the tape.

COMPARATIVE EXAMPLE 5

In this experiment, 70 grams of MYR 113-43 oligomer was formulated with 30 grams of trimethylolpropane trimethacrylate (TMPTMA—BASF), 5 parts per hundred of a liquid photoinitiator blend comprising diphenyl (2,4,6-trimethylbenzolyl) phosphinoxid (CAS 75980-60-8) 2-hydroxy-2-methylpropiophenone (CAS 7473-98-5) and was tested for its coating property on glass and steel surfaces. In one of the two samples tested, 2 parts per hundred of ter-Butyl peroxybenzoate (TBPB, CAS#614-45-9) was added. $3/10$ millimeter thick coating was applied and run through the UV radiation unit three times at the belt speed of 100 ft./min. The results of this using cross hatch adhesion testing with these two different polyester resins are shown in the Table 5. A "Pass" with no number indicates 100% adhesion. A number indicates an approximate amount of coating left on the substrate. Thus a "Pass" with 95% means 95% of the coating stayed with the substrate while 5% came off on the tape. A "Fail" with 75% means an even distribution of coating on both the substrate and the tape.

COMPARATIVE EXAMPLE 6

In this experiment, 35 grams of each of the three different ester oligomers namely, MYR 160-3, Epoxy Acrylate and Polyester Acrylate were formulated with 38 grams of isobornyl acrylate (Allnex—UV/EB Curable Resins), 22 grams of MIRAMER M4004 polyetherpolytetraacrylate (Rahn USA Corp.) and 5 grams of LTD (a photoinitiator from Rahn USA Corp.) and subjected to adhesion test on the polyester, polyethylene and polypropylene surfaces. $3/10$ millimeter thick coating was applied and run through the UV radiation unit three times at the belt speed of 100 ft./min. The results of this adhesion testing with three different polyester resins are shown in the Table 6. A "Pass" indicates 100% adhesion. A "Fail" means the applied coating is removed from the substrate in the adhesion testing.

COMPARATIVE EXAMPLE 7

In this experiment, 35 grams of each of the three different ester oligomers namely, MYR 113-178, Epoxy Acrylate and Polyester Acrylate were formulated with 38 grams of isobornyl acrylate (Allnex—UV/EB Curable Resins), 22 grams of MIRAMER M4004 polyetherpolytetraacrylate (Rahn USA Corp.) and 5 grams of LTD (a photoinitiator from Rahn USA Corp.) and subjected to adhesion test on the polyester, polyethylene and polypropylene surfaces. $3/10$ millimeter thick coating was applied and run through the UV radiation unit three times at the belt speed of 100 ft./min. The results of this adhesion testing with three different polyester resins are shown in the Table 7. A "Pass" indicates 100% adhesion. A "Fail" means the applied coating is removed from the substrate in the adhesion testing.

COMPARATIVE EXAMPLE 8

In this experiment, 35 grams of each of the three different ester oligomers namely, MYR 159-13, Epoxy Acrylate and Polyester Acrylate were formulated with 38 grams of isobornyl acrylate (Allnex—UV/EB Curable Resins), 22 grams of MIRAMER M4004 polyetherpolytetraacrylate (Rahn USA Corp.) and 5 grams of LTD (a photoinitiator from Rahn USA Corp.) and subjected to adhesion test on the polyester, polyethylene and polypropylene surfaces. $3/10$ millimeter thick coating was applied and run through the UV radiation unit three times at the belt speed of 100 ft./min. The results of this adhesion testing with three different polyester resins are shown in the Table 8. A "Pass" indicates 100% adhesion. A "Fail" means the applied coating is removed from the substrate in the adhesion testing.

COMPARATIVE EXAMPLE 9

In this experiment, 35 grams of each of the three different ester oligomers namely, MYR 113-181, Epoxy Acrylate and Polyester Acrylate were formulated with 38 grams of isobornyl acrylate (Allnex—UV/EB Curable Resins), 22 grams of MIRAMER M4004 polyetherpolytetraacrylate (Rahn USA Corp.) and 5 grams of LTD (a photoinitiator from Rahn USA Corp.) and subjected to adhesion test on the polyester, polyethylene and polypropylene surfaces. $3/10$ millimeter thick coating was applied and run through the UV radiation unit three times at the belt speed of 100 ft./min. The results of this adhesion testing with three different polyester resins are shown in the Table 9. A "Pass" indicates 100% adhesion. A "Fail" means the applied coating is removed from the substrate in the adhesion testing.

COMPARATIVE EXAMPLE 10

In this experiment, 35 grams of each of the three different ester oligomers namely, MYR 160-61, Epoxy Acrylate and Polyester Acrylate were formulated with 38 grams of isobornyl acrylate (Allnex—UV/EB Curable Resins), 22 grams of MIRAMER M4004 polyetherpolytetraacrylate (Rahn USA Corp.) and 5 grams of LTD (a photoinitiator from Rahn USA Corp.) and subjected to adhesion test on the polyester, polyethylene and polypropylene surfaces. $3/10$ millimeter thick coating was applied and run through the UV radiation unit three times at the belt speed of 100 ft./min. The results of this adhesion testing with three different polyester resins are shown in the Table 10. A "Pass" indicates 100% adhesion. A "Fail" means the applied coating is removed from the substrate in the adhesion testing.

COMPARATIVE EXAMPLE 11

In this experiment, the possibility of combining the dicyclopentadiene modified ester oligomer of the present invention (MYR 113-43) with mono (2-acryloxyethyl) succinate (Myribond AF) obtained by reacting hydroxyl ethyl acrylate (CAS 818-61-1) with succinic anhydride (CAS 108-30-5). Mono (2-acryloxyethyl) succinate (MAES) is also commercially available as a coating reagent from Dixie Chemicals, Pasadena Tex. In the preparation of one polyester resin formulation according to the present invention, 50 gram of MYR113-43 was combined with 50 grams of mono (2-acryloxyethyl) succinate and to the combined mixture was added one part per hundred of Irgacure 184 (CIBA), 4 parts per hundred of Genomer CPK (Rahn USA Corp.) and a drop of Dow Corning Additive 57 solution. In the preparation of a second formulation, 25 gram of MYR113-43 was combined with 75 grams of mono (2-acryloxyethyl) succinate and to the combined mixture was added one part per hundred of Irgacure 184 (CIBA), 4 parts per hundred of Genomer CPK and a drop of Dow Corning Additive 57 solution. These two polyester resin formulations were tested for its coating property on glass and steel surfaces. 3/10 millimeter thick coating was applied and run through the UV radiation unit three times at the belt speed of 100 ft./min and the adhesive property of the coating formulation was tested using cross hatch testing. A "Pass" with no number indicates 100% adhesion.

The applicants' invention has been described in detail above with particular reference to preferred embodiment. A skilled practitioner familiar with the above detailed description can make any modification without departing from the spirit of the claims that follow.

TABLE 1

Tape adhesion test for different polyester resins on different substrates

| Polyester Resin | Polyester | Poly-propylene | Steel | Poly-ethylene | Glass (Crosshatch) |
|---|---|---|---|---|---|
| MYR 113-43 | Pass | Pass | Fail | Pass | Fail |
| Dystar DCPD | Pass (95%) | Fail (75%) | Fail | Pass | Fail |
| Oligomer Genomer* 2252/TP20 | Fail (50%) | Fail (40%) | Fail | Fail | Fail |
| Polyester Acrylate 03-849 | Fail | Fail | Fail | Fail | Fail |

TABLE 2

Tape adhesion test for different polyester resins on different substrates

| Polyester Resin | Polyester | Poly-propylene | Steel | Poly-ethylene | Glass (Crosshatch) |
|---|---|---|---|---|---|
| MYR 113-43 | Pass | Pass | Pass | Pass | Pass (95%) |
| Dystar DCPD | Pass | Pass | Pass | Pass | Pass (99%) |
| Oligomer Genomer* 2252/TP20 | Fail | Pass | Fail (80%) | Fail | Fail |
| Polyester Acrylate 03-849 | Fail | Fail (50%) | Fail (50%) | Fail | Fail (50%) |

TABLE 3

Tape adhesion test for different polyester resins on different substrates

| Polyester Resin | Polyester | Poly-propylene | Steel | Poly-ethylene | Glass (Crosshatch) |
|---|---|---|---|---|---|
| MYR 113-43 | Pass | Fail (50%) | Fail (80%) | Pass | Fail |
| Dystar DCPD | Pass | Pass | Fail (25%) | Pass | Fail |
| Oligomer Genomer* 2252/TP20 | Fail | Fail | Fail | Pass (95%) | Fail |
| Polyester Acrylate 03-849 | Fail | Fail | Fail | Pass | Fail |

TABLE 4

Tape adhesion test for different polyester resins on different substrates

| Polyester Resin | Polyester | Poly-propylene | Steel | Poly-ethylene | Glass (Crosshatch) |
|---|---|---|---|---|---|
| MYR 113-43 | Pass | Fail (25%) | Pass | Pass | Fail (15%) |
| Dystar DCPD | Pass | Pass | Pass | Pass | Fail (75%) |
| Oligomer Genomer* 2252/TP20 | Fail | Fail | Fail | Pass | Fail |
| Polyester Acrylate 03-849 | Fail | Fail | Fail | Pass | Fail |

TABLE 5

Tape adhesion test for two different resin samples on two different substrates

| | Components of polymer resin | | | | Material tested | |
|---|---|---|---|---|---|---|
| Sample # | MYR 113-43 | TMPTMA | Liquid photoinitiator blend | TBPB | Glass | Steel |
| Sample #1 | 70 grams | 30 grams | 5 parts per hundred | 0 | Pass (95%) | Fail (75%) |
| Sample #2 | 70 grams | 30 grams | 5 parts per hundred | 2 parts per hundred | Pass (90%) | Pass |

TABLE 6

Tape adhesion test for different polyester resins on different substrates

| Polyester Resin | Substrate | | |
|---|---|---|---|
| | Polyester | Polyethylene | Polypropylene |
| MYR 160.3 | Pass | Pass | Pass |
| Epoxy Acrylate | Fail | Fail | Fail |
| Polyester Acrylate | Fail | Fail | Fail |

TABLE 7

Tape adhesion test for different polyester resins on different substrates

| Polyester Resin | Substrate | | |
|---|---|---|---|
| | Polyester | Polyethylene | Polypropylene |
| MYR 113-178 | Pass | Pass | Pass |
| Epoxy Acrylate | Fail | Fail | Fail |
| Polyester Acrylate | Fail | Fail | Fail |

TABLE 8

Tape adhesion test for different polyester resins on different substrates

| Polyester Resin | Substrate | | |
|---|---|---|---|
| | Polyester | Polyethylene | Polypropylene |
| MYR 159-13 | Pass | Pass | Pass |
| Epoxy Acrylate | Fail | Fail | Fail |
| Polyester Acrylate | Fail | Fail | Fail |

TABLE 9

Tape adhesion test for different polyester resins on different substrates

| Polyester Resin | Substrate | | |
|---|---|---|---|
| | Polyester | Polyethylene | Polypropylene |
| MYR 113-181 | Pass | Pass | Pass |
| Epoxy Acrylate | Fail | Fail | Fail |
| Polyester Acrylate | Fail | Fail | Fail |

TABLE 10

Tape adhesion test for a polyester resin prepared using a trifunctional dicyclopentadiene modified ester oligomer with urethane acrylate functional group, epoxy acrylate and polyester acrylate

| Polyester Resin | Substrate | | |
|---|---|---|---|
| | Polyester | Polyethylene | Polypropylene |
| MYR 160-61 | Pass | Pass | Pass |
| Epoxy Acrylate | Fail | Fail | Fail |
| Polyester Acrylate | Fail | Fail | Fail |

TABLE 11

Tape adhesion test for two different resin samples on two different substrates

| Sample | MYR 113-43 | MAES | Glass surface | Steel Surface |
|---|---|---|---|---|
| Sample #1 | 50 grams | 50 grams | Pass | Pass |
| Sample #2 | 75 grams | 25 grams | Pass | Pass |

REFERENCES

All references are listed for the convenience of the reader. Each reference is incorporated by reference in its entirety.

U.S. Pat. No. 3,166,434
U.S. Pat. No. 3,347,806
U.S. Pat. No. 3,399,153
U.S. Pat. No. 3,448,066
U.S. Pat. No. 3,883,612
U.S. Pat. No. 3,340,327
U.S. Pat. No. 3,933,757
U.S. Pat. No. 4,029,848
U.S. Pat. No. 4,100,120
U.S. Pat. No. 4,100,133
U.S. Pat. No. 4,148,765
U.S. Pat. No. 4,167,542
U.S. Pat. No. 4,183,833
U.S. Pat. No. 4,233,432
U.S. Pat. No. 4,252,701
U.S. Pat. No. 4,322,504
U.S. Pat. No. 4,332,931
U.S. Pat. No. 4,339,367
U.S. Pat. No. 4,348,499
U.S. Pat. No. 4,360,647
U.S. Pat. No. 4,435,530
U.S. Pat. No. 4,443,580
U.S. Pat. No. 4,496,688
U.S. Pat. No. 4,522,977
U.S. Pat. No. 4,522,978
U.S. Pat. No. 4,525,427
U.S. Pat. No. 4,532,296
U.S. Pat. No. 4,532,297
U.S. Pat. No. 4,540,829
U.S. Pat. No. 4,623,696
U.S. Pat. No. 4,626,570
U.S. Pat. No. 4,921,883
U.S. Pat. No. 5,318,808
U.S. Pat. No. 5,559,163
U.S. Pat. No. 5,770,653
U.S. Pat. No. 6,228,146
U.S. Pat. No. 6,632,481
U.S. Pat. No. 6,384,151
U.S. Pat. No. 6,384,152
U.S. Pat. No. 6,515,071

U.S. Pat. No. 6,632,481
U.S. Pat. No. 6,803,393
U.S. Pat. No. 8,449,960
US Patent Application Publication No. US 2003/0134929 A1
U.S. Patent Application Publication No. US 2008/0139691 A1
U.S. Patent Application Publication No. US 2013/0324644 A1
U.S. Patent Application Publication No. US 2014/0171589 A1
European Patent No. EP 1,131,372

What is claimed:

1. A dicyclopentadiene modified ester oligomer of formula (I), wherein R is a hydrocarbon group comprising 1 to 20 carbon atoms and R''' is a hydrocarbon group comprising 1 to 20 carbon atoms (I)

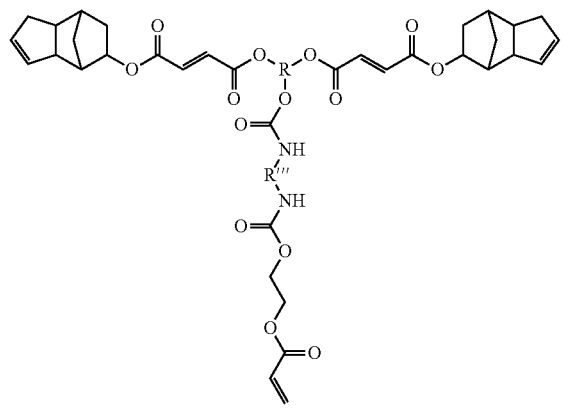

2. The dicyclopentadiene modified ester oligomer of claim 1, wherein R comprises 6 carbon atoms.

3. The dicyclopentadiene modified ester oligomer of claim 2, wherein R''' comprises 10 carbon atoms.

4. A coating composition, comprising the dicyclopentadiene modified ester oligomer of claim 3 and at least one ethylenically unsaturated monomer.

5. The coating composition of claim 4, wherein said at least one ethylenically unsaturated monomer is selected from the group consisting of styrene, p-vinyltoluene, α-methyl styrene, methyl acrylate, methyl methacrylate, diallyl phthalate, triallyl cyanurate, vinyl ether, 2-ethylhexyl acrylate (2-EHA), isobornyl acrylate (IBOA), trimethylolpropane trimethacrylate (TMPTMA), and polyetherpolytetraacrylate.

6. A coating composition, comprising the dicyclopentadiene modified ester oligomer of claim 1 and at least one ethylenically unsaturated monomer.

7. The coating composition of claim 6, wherein said at least one ethylenically unsaturated monomer is selected from the group consisting of styrene, p-vinyltoluene, α-methyl styrene, methyl acrylate, methyl methacrylate, diallyl phthalate, triallyl cyanurate, vinyl ether, 2-ethylhexyl acrylate (2-EHA), isobornyl acrylate (IBOA), trimethylolpropane trimethacrylate (TMPTMA), and polyetherpolytetraacrylate.

8. The coating composition of claim 7 or claim 5, further comprising a photoinitiator.

* * * * *